United States Patent
Sharp (10) Patent No.: US 8,923,502 B2
(45) Date of Patent: *Dec. 30, 2014

(54) CUSTOMER SERVICE SYSTEM, METHOD, AND SOFTWARE PROGRAM PRODUCT FOR RESPONDING TO QUERIES USING NATURAL LANGUAGE UNDERSTANDING

(71) Applicant: Nuance Communications, Inc., Burlington, MA (US)

(72) Inventor: Robert Douglas Sharp, Palo Alto, CA (US)

(73) Assignee: Nuance Communications, Inc., Burlington, MA (US)

(*) Notice: Subject to any disclaimer, the term of this patent is extended or adjusted under 35 U.S.C. 154(b) by 14 days.

This patent is subject to a terminal disclaimer.

(21) Appl. No.: 13/774,910

(22) Filed: Feb. 22, 2013

(65) Prior Publication Data

US 2013/0223600 A1    Aug. 29, 2013

Related U.S. Application Data

(63) Continuation of application No. 12/803,314, filed on Jun. 24, 2010, now Pat. No. 8,391,464.

(51) Int. Cl.
*H04M 3/00* (2006.01)
*H04M 3/51* (2006.01)

(52) U.S. Cl.
CPC .............. *H04M 3/5166* (2013.01); *H04M 3/00* (2013.01)
USPC ................................... 379/265.01; 379/88.01

(58) Field of Classification Search
None
See application file for complete search history.

(56) References Cited

U.S. PATENT DOCUMENTS

| | | | |
|---|---|---|---|
| 4,164,025 A | 8/1979 | Dubnowski et al. |
| 4,697,282 A | 9/1987 | Winter et al. |
| 4,918,322 A | 4/1990 | Winter et al. |
| 5,386,455 A | 1/1995 | Cooper |
| 5,553,119 A | 9/1996 | McAllister et al. |
| 5,638,425 A | 6/1997 | Meador et al. |
| 5,677,990 A | 10/1997 | Junqua |
| 5,724,481 A | 3/1998 | Garberg et al. |
| 5,799,065 A | 8/1998 | Junqua et al. |
| 5,819,265 A | 10/1998 | Ravin et al. |
| 5,875,394 A | 2/1999 | Daly et al. |
| 5,946,613 A | 8/1999 | Hayes et al. |

(Continued)

OTHER PUBLICATIONS

Simoudis, E. (2000). If it's not one channel, then it's another. Bank Marketing, 32(1), 48-50+.

*Primary Examiner* — Duc Nguyen
*Assistant Examiner* — Assad Mohammed
(74) *Attorney, Agent, or Firm* — Lesani Law Group, PC (57) ABSTRACT

The present invention uses natural language understanding to increase the ability of a customer service system to respond to a user's query in an automated manner. A customer service system receives a query from a user and offers the user the option of having the system contact the user at a later time with an answer. If the user accepts the offer, the customer service system processes the query offline, including providing the query to a natural language understanding interpreter. The system uses the natural language understanding interpretation to determine if the user's query is in a database of frequently-asked queries. For each query in the database of frequently-asked queries, there is a predetermined response protocol. If the user's query substantially matches a query in the database, the IVR system contacts the user with an automated response in accordance with the predetermined response protocol for the query.

19 Claims, 8 Drawing Sheets

(56) References Cited

U.S. PATENT DOCUMENTS

| | | | |
|---|---|---|---|
| 5,991,720 A | 11/1999 | Galler et al. | |
| 6,167,383 A | 12/2000 | Henson | |
| 6,173,266 B1 | 1/2001 | Marx et al. | |
| 6,208,965 B1 | 3/2001 | Brown et al. | |
| 6,216,111 B1 | 4/2001 | Walker et al. | |
| 6,314,165 B1 | 11/2001 | Junqua et al. | |
| 6,334,103 B1 | 12/2001 | Surace et al. | |
| 6,363,357 B1 | 3/2002 | Rosenberg et al. | |
| 6,404,876 B1 | 6/2002 | Smith et al. | |
| 6,473,734 B1 | 10/2002 | Dvorak | |
| 6,490,521 B2 | 12/2002 | Wiener | |
| 6,584,180 B2 | 6/2003 | Nemoto | |
| 6,587,558 B2* | 7/2003 | Lo | 379/265.09 |
| 6,618,704 B2 | 9/2003 | Kanevsky et al. | |
| 6,650,887 B2 | 11/2003 | McGregor et al. | |
| 6,662,163 B1 | 12/2003 | Albayrak et al. | |
| 6,728,353 B1 | 4/2004 | Espejo et al. | |
| 6,731,737 B2 | 5/2004 | Davis | |
| 6,792,102 B2* | 9/2004 | Shires | 379/265.04 |
| 6,853,987 B1 | 2/2005 | Cook | |
| 6,876,728 B2 | 4/2005 | Kredo et al. | |
| 6,917,802 B1 | 7/2005 | Nilsson | |
| 6,996,531 B2 | 2/2006 | Korall et al. | |
| 7,006,971 B1 | 2/2006 | Stahl et al. | |
| 7,023,979 B1 | 4/2006 | Wu et al. | |
| 7,143,037 B1 | 11/2006 | Chestnut | |
| 7,412,402 B2* | 8/2008 | Cooper | 705/7.42 |
| 7,424,427 B2 | 9/2008 | Liu et al. | |
| 7,487,095 B2 | 2/2009 | Hill et al. | |
| 7,529,678 B2 | 5/2009 | Kobal | |
| 7,698,140 B2 | 4/2010 | Bhardwaj et al. | |
| 7,724,878 B2 | 5/2010 | Timmins et al. | |
| 7,783,755 B2* | 8/2010 | Goss et al. | 709/225 |
| 7,881,703 B2* | 2/2011 | Roundtree et al. | 455/414.1 |
| 7,996,251 B2* | 8/2011 | Kannan et al. | 705/7.13 |
| 2001/0010714 A1 | 8/2001 | Nemoto | |
| 2001/0011230 A1 | 8/2001 | Morganstein et al. | |
| 2001/0037241 A1 | 11/2001 | Puri | |
| 2001/0039492 A1 | 11/2001 | Nemoto | |
| 2001/0056359 A1 | 12/2001 | Abreu | |
| 2002/0010000 A1 | 1/2002 | Chern et al. | |
| 2002/0034940 A1 | 3/2002 | Takae et al. | |
| 2002/0065736 A1 | 5/2002 | Wilner et al. | |
| 2002/0077833 A1 | 6/2002 | Arons et al. | |
| 2002/0077898 A1 | 6/2002 | Koulouris | |
| 2002/0087323 A1 | 7/2002 | Thomas et al. | |
| 2002/0120582 A1 | 8/2002 | Elston et al. | |
| 2002/0169618 A1 | 11/2002 | Caspari | |
| 2002/0177914 A1 | 11/2002 | Chase | |
| 2003/0007464 A1 | 1/2003 | Balani | |
| 2003/0023439 A1 | 1/2003 | Ciurpita et al. | |
| 2003/0061171 A1 | 3/2003 | Gilbert et al. | |
| 2003/0130904 A1 | 7/2003 | Katz et al. | |
| 2003/0162561 A1 | 8/2003 | Johnson et al. | |
| 2003/0177009 A1 | 9/2003 | Odinak et al. | |
| 2003/0185359 A1 | 10/2003 | Moore et al. | |
| 2003/0204444 A1 | 10/2003 | Van Luchene et al. | |
| 2004/0012501 A1 | 1/2004 | Mazzara et al. | |
| 2004/0019487 A1 | 1/2004 | Kleindienst et al. | |
| 2004/0047453 A1 | 3/2004 | Fraser | |
| 2004/0111267 A1* | 6/2004 | Jadhav et al. | 704/270 |
| 2004/0161097 A1 | 8/2004 | Henry | |
| 2004/0162724 A1 | 8/2004 | Hill et al. | |
| 2004/0185833 A1 | 9/2004 | Walden et al. | |
| 2005/0131910 A1 | 6/2005 | Yanagisawa | |
| 2005/0163296 A1 | 7/2005 | Smith et al. | |
| 2005/0177368 A1 | 8/2005 | Odinak | |
| 2005/0183032 A1 | 8/2005 | Bushey et al. | |
| 2005/0261990 A1 | 11/2005 | Gocht et al. | |
| 2006/0009218 A1 | 1/2006 | Moss | |
| 2006/0080107 A1 | 4/2006 | Hill et al. | |
| 2006/0106610 A1 | 5/2006 | Napper | |
| 2006/0135215 A1 | 6/2006 | Chengalvarayan et al. | |
| 2006/0262919 A1 | 11/2006 | Danson et al. | |
| 2007/0117584 A1 | 5/2007 | Davis et al. | |
| 2008/0088440 A1 | 4/2008 | Palushaj | |
| 2009/0164214 A1 | 6/2009 | Baciu et al. | |

* cited by examiner

Fig. 5b

CUSTOMER SERVICE SYSTEM, METHOD, AND SOFTWARE PROGRAM PRODUCT FOR RESPONDING TO QUERIES USING NATURAL LANGUAGE UNDERSTANDING

RELATED APPLICATIONS

This application is a continuation of prior, co-pending U.S. patent application Ser. No. 12/803,314, entitled "Customer Service System, Method, and Software Program Product for Responding to Queries Using Natural Language Understanding," and filed on Jun. 24, 2010, the contents of which are incorporated by reference as if fully disclosed herein.

BACKGROUND OF THE INVENTION

1. Field of the Invention

This invention relates generally to IVR and other customer service systems, and, more particularly, to using natural language understanding to better respond to customer queries in a customer service/IVR system.

2. Description of the Background Art

Many companies use interactive voice response systems to communicate with customers over the phone. Using an IVR system enables customer calls to be handled more quickly and more cost effectively than having live agents handle all calls.

Callers to an IVR system will often elect to "opt out" of the IVR system and queue for a human agent. The opt-out rate in IVR systems can be significant—30-35% on average and as high as 65%. When a user opts out of an IVR system, the cost for handling customer calls increases because live agent time is more expensive than IVR system time. Also, when a user opts for a live agent, the hold time for the user can be significant (several minutes or longer). Therefore, it is desirable to have an IVR system (or other customer service system) that can better respond to user queries in an automated manner in order to minimizing agent cost while maintaining or increasing user satisfaction.

SUMMARY

The present invention provides a system, method, and software program that use natural language understanding to increase the ability of a customer service system to respond to a user's query in an automated manner.

In one embodiment of the invention, the customer service system is an IVR system. In such embodiment, when an IVR system receives a request from a user to speak with a live agent, the user is offered the option to record a query and have the system contact the user at a later time with a response to the query. For example, if a user requests an agent, the IVR system may inform the user that there is a queue for an agent, and provide the user with the option of having the system contact the user at a later time with a response to his/her query. This may be appealing to a user, as the user will not have to wait on the phone for an agent.

If the user accepts the option, the IVR system asks the user to state his query. The IVR system records the query and then terminates the call with the user. The IVR system provides the user' query to an offline natural language understanding interpreter and receives a natural language understanding result. Performing the natural language understanding processing offline (i.e., when the user is not on the line) instead of in real-time enables the IVR system to obtain a higher-quality and likely more accurate understanding of the user's query, The IVR system maintains a database of frequently-asked queries and corresponding response protocols. The IVR system users the natural language understanding result to determine if the user's query matches a query in the database. If so, the IVR system contacts the user with an automated response in accordance with the predetermined response protocol for the query. If the user's query does not match an entry in the database, the IVR system requests a response from a live agent then sends the agent's response in an automated manner. The user may be contacted via a variety of communication channels, including, but not limited to phone, email, web chat, and SMS.

In an alternate embodiment of the invention, the system does not terminate the call with the user after the user records a query. Instead, the system uses real-time natural language understanding to attempt to assist the user while the user is queuing for an agent.

The present invention is not limited to IVR systems and the methods described herein can apply to queries submitted to customer service systems via email, SMS, web chat, and other channels.

DETAILED DESCRIPTION OF THE PREFERRED EMBODIMENTS

The present invention provides a system, method, and software program that use natural language understanding to increase the ability of a customer service system to respond to a user's query in an automated manner. For purpose of this invention, a query includes the following:

A question (e.g., "What is my account balance?")
A request (e.g., "I want to buy 50 shares of GE stock")
A problem statement (e.g., "There is a strange item on my bill")
A destination for a front-end routing system (e.g., "I need technical assistance.")

Figure 1A:
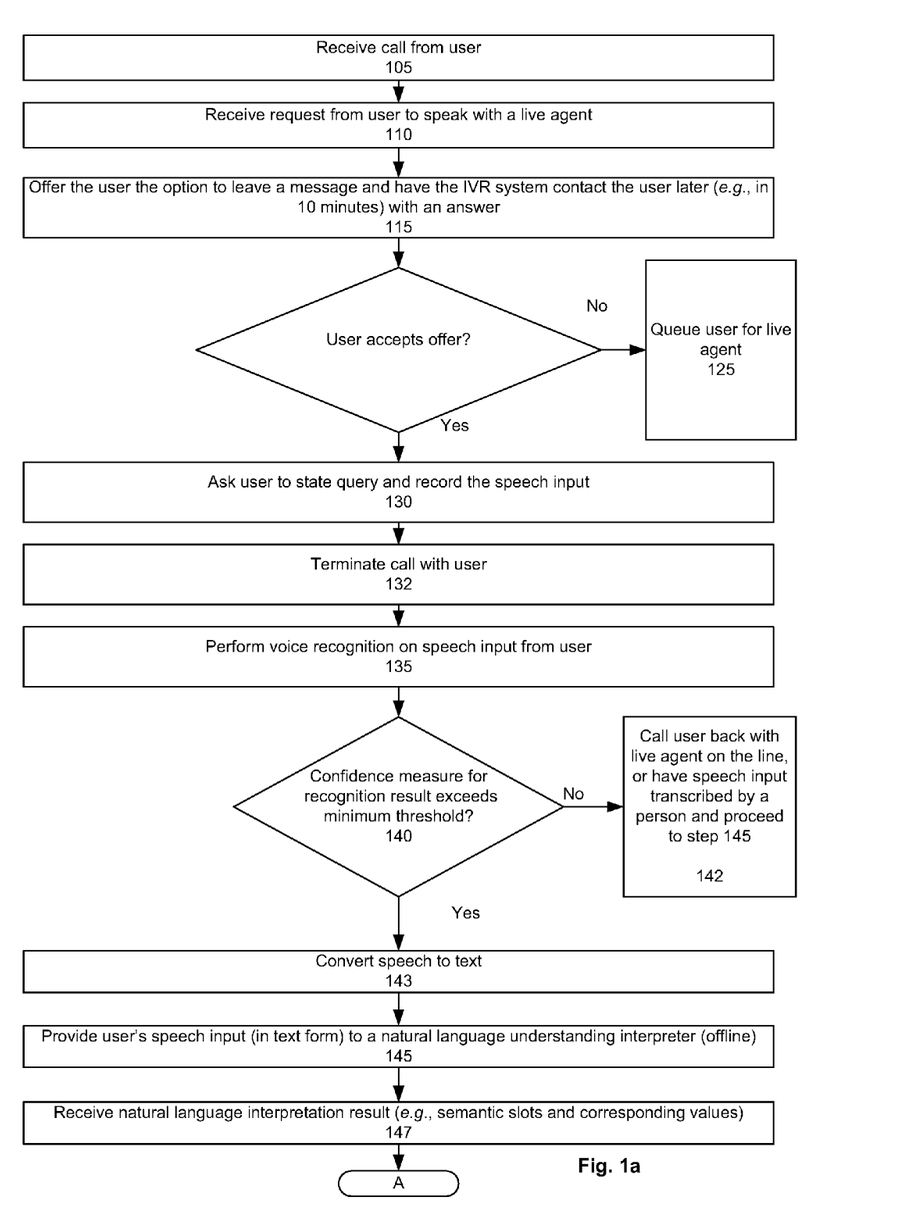
FIGS. 1a-1b are a flowchart that illustrates a method performed by an IVR system for providing an automated response to a user using natural language understanding.
Figure 1B:
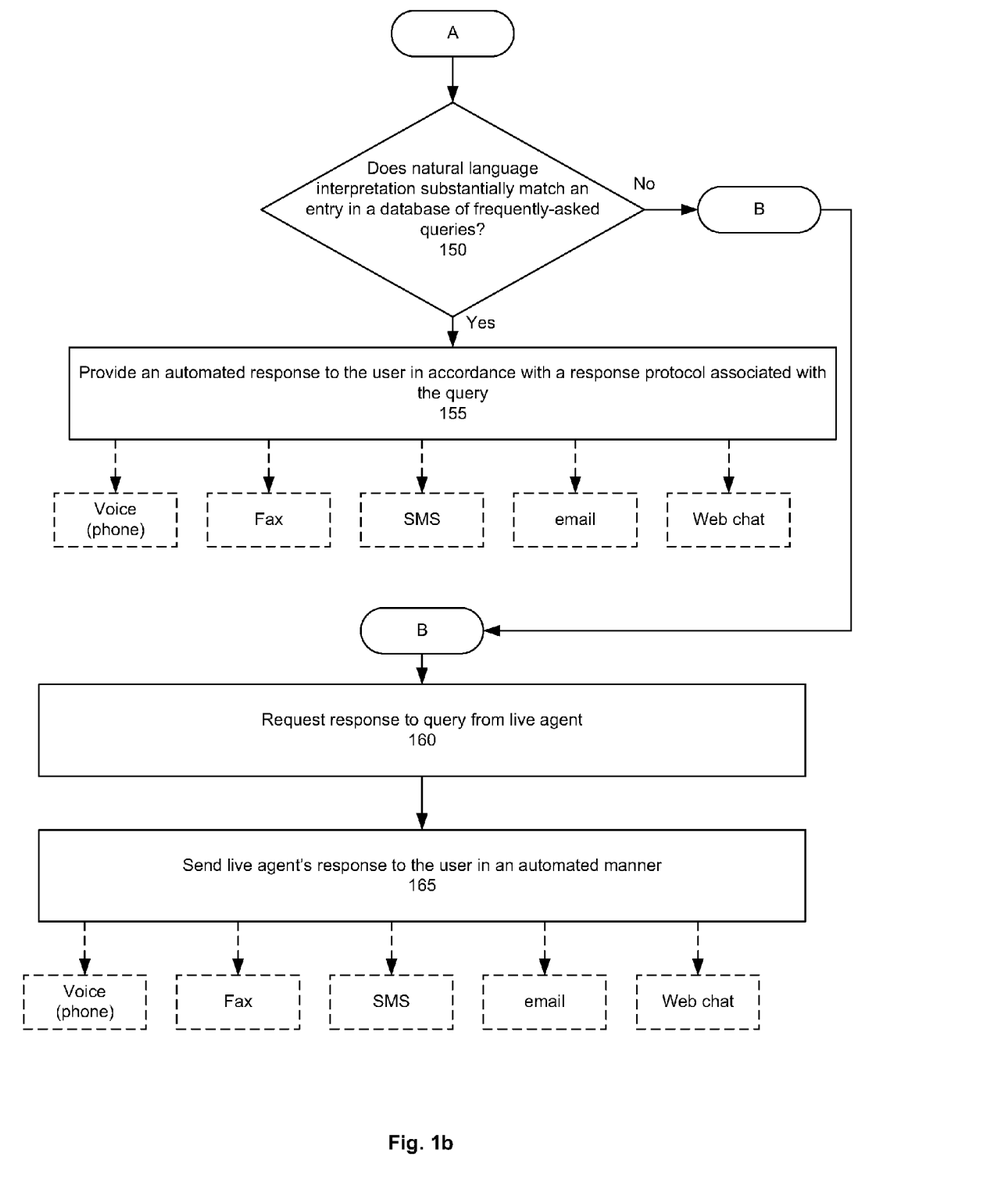

FIG. 1 illustrates one embodiment of the present invention. In the method illustrated in FIG. 1, the customer service system is an IVR system.

In the method of FIG. 1, an IVR system receives a call from a user (step 105). The IVR subsequently receives a request from the user to speak with a live agent (step 110). In response to receiving such request, the IVR system offers the user the option to leave a message and have the IVR system contact the user later (e.g., 10 minutes) with an answer (step 115). For example, the IVR system may inform the user that there is a wait for a live agent and offer the user option of having the system contact the user at a later time instead of waiting on the phone for an agent.

If the user declines the offer, the user is queued for a live agent (step 125). If the user accepts the offer, the IVR system prompts the user to state his/her query, and records the subsequent speech input (step 130). The IVR system then terminates the call with the user (step 132).

The IVR system performs voice recognition on the speech input and obtains a voice recognition result with associated confidence measure(s) (step 135). If the confidence measure(s) for the voice recognition result does not meet a minimum threshold (step 140), the IVR system either (i) calls the user back with a live agent or (ii) has the speech input transcribed by a person and proceeds to step 145 (step 142).

Performing the speech recognition offline enables the system to spend more time on the recognition process and, thus, likely obtain a more accurate recognition result. However, in an alternate embodiment, step 135 is performed in real-time while the user is still on the line. In such embodiment, if the system has difficulty recognizing the user's speech, the user may be queued for a live agent instead of terminating the call.

If the system is able to obtain a recognition result that meets or exceeds the minimum threshold, the system optionally converts the best recognition result to text (step 143). The user's speech input (either in voice or text form) is then provided to a natural language understanding interpreter (step 145). As is the case with the speech recognition, performing the natural language understanding processing offline (i.e., when the user is not on the line) gives the system more time to do the processing and, hence, obtain a better semantic understanding of the user's query.

The natural language interpreter provides a natural language interpretation result (step 147). In one embodiment, the result is a set of semantic slots and corresponding values for such semantic slots. For example, if the user's query is "I want to transfer $500 from checking to saving, the interpretation result may be as follows:

| SEMANTIC SLOT | VALUE |
| --- | --- |
| COMMAND-TYPE | "TRANSFER" |
| SOURCE-ACCOUNT | "SAVINGS" |
| DESTINATION-ACCOUNT | "CHECKING" |
| AMOUNT | "500" |

In the preferred embodiment, the interpretation result includes a confidence measure for each slot and corresponding value.

The IVR system uses the natural language interpretation result to determine if the user's query substantially matches an entry in a database of frequently-asked queries (step 150). In one embodiment, this comprises determining if the slots and corresponding values match or substantially match an entry in the database with a minimum degree of confidence.

Each query in the database of frequently-asked queries is associated with a predetermined response protocol. If the user's query substantially matches a query in the database of frequently-asked queries, the system provides an automated response in accordance with the response protocol for the query (step 155). The response protocol may involve a back-and-forth dialog between the user and the system. For example, the response protocol may specify required information that is needed from the user, and, if the system does not have all such required information, the response protocol would include asking the user for the information. Also, the response protocol may depend on other environmental data, such as user account information or inventory data.

If the query is a question, the response may be an answer to the question. If the user's query is a request, the response from the system may be a dialog that assists the user with the requested transaction. If the user's query is a problem statement, the response from the system may be either a dialog that assists the user with solving the problem or a notification that the problem has been resolved. If the IVR system is a front-end routing system, the response may be a call back to the user with the correct destination on the line.

In one embodiment, after the system provides a response, the system asks the user if he/she is satisfied with the response. If the user is not satisfied with the response, the system offers to transfer the user to a live agent. If the user accepts the offer, the system may give the user a high priority in queuing for an agent.

The system may provide the response to the user via one or more of a plurality of communication channels, including but not limited to, voice, fax, SMS, email, and web chat.

Referring again to step 150 in FIG. 1, if the natural language interpretation result for the user's query does not substantially match an entry in the database, the system requests live agent assistance (step 160). In the preferred embodiment, the user's query is sent in text form to the agent, and the agent types a text response. The response is then sent to the user via voice (in which case the text is converted to speech), fax, SMS, email, or web chat (step 165). In an alternate embodiment, the system calls (or otherwise contacts) the user back with a live agent on the line if the user's query is not in the database.

Figure 5A:
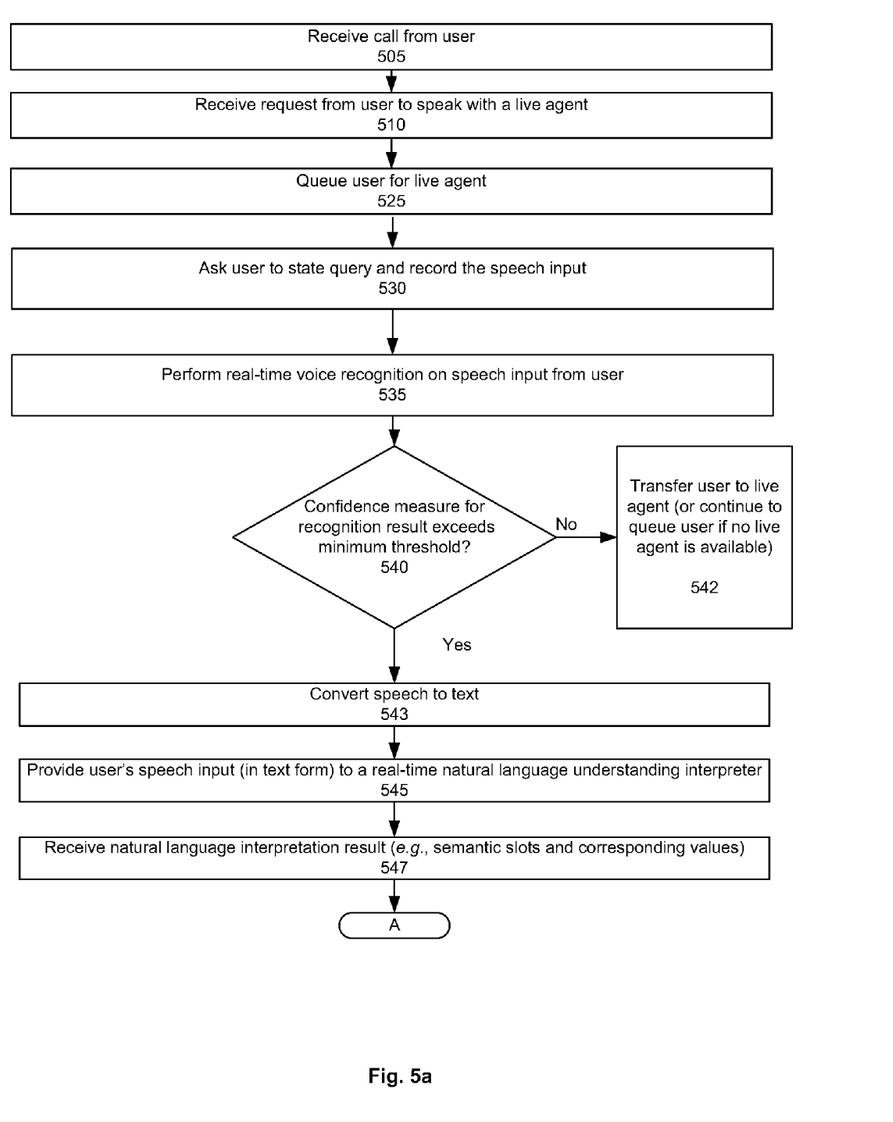
FIGS. 5a-5b are a flowchart that illustrates an alternate method performed by an IVR system for providing an automated response to a user using natural language understanding.
Figure 5B:
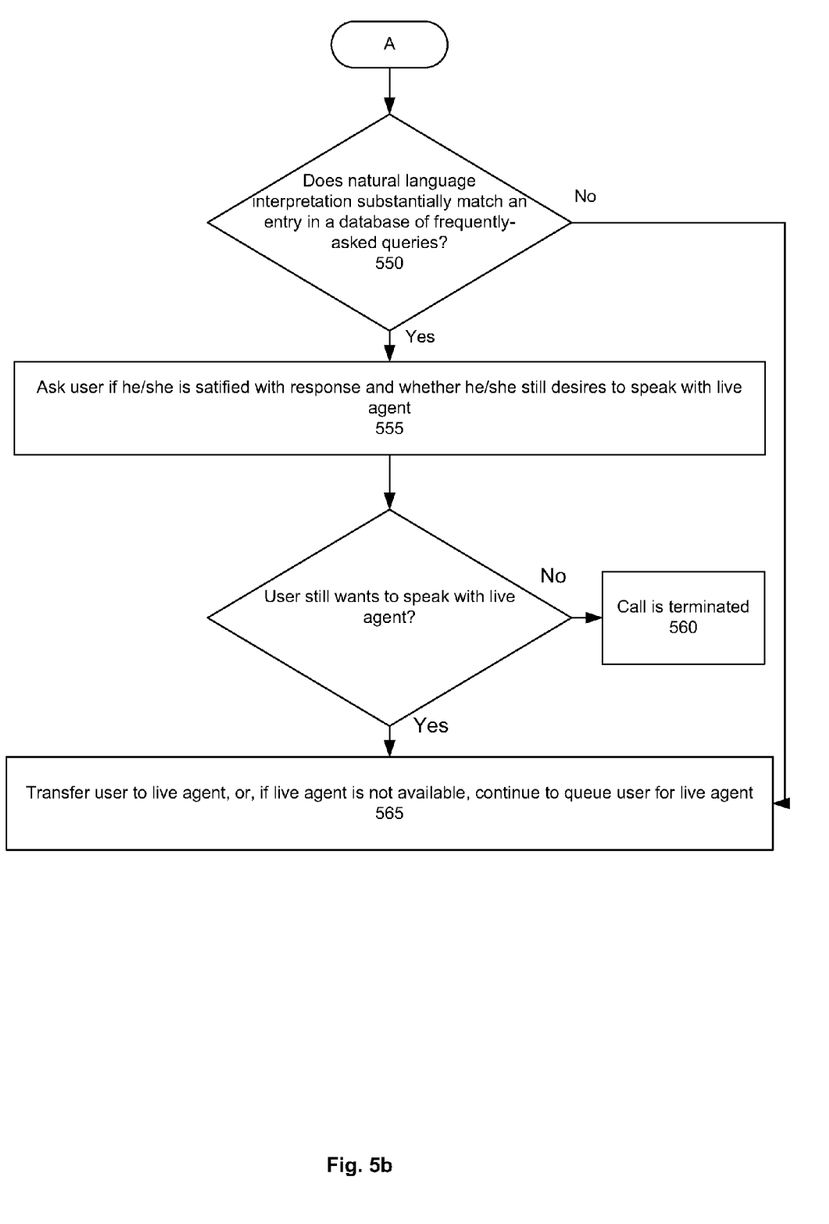

FIG. 5 illustrates an alternate embodiment of the invention in which the user stays on the line throughout the process. In this embodiment, the system answers a call from the user (step 505) and, during the call receives a request to speak with a live agent (step 510). The system queues the user for a live agent (step 525) and, while the user is queuing, attempts to assist the user with his/her query. For example, system may tell the user "An agent will be with you shortly. In the meantime, I'll try to assist you. Please tell me the purpose of your call." The system asks the user to state his/her query and records the speech input (step 530). In an alternate embodiment, proceeding with step 530 could be optional, depending on whether or not the user wants the system to try to help the user while the user is queuing for a live agent (i.e., the user could be offered the option of having the system assist him/her while waiting for an agent).

Steps 535-550 are essentially the same as steps 135-150 in FIG. 1, except, when performing the method of FIG. 5, the IVR system uses real-time voice recognition and real-time natural language understanding. In step 550, if the user's query matches an entry in the database of frequently-asked queries, the IVR system asks the user if he/she is satisfied with the response and if he/she still desires to speak with a live agent (step 555). If the user still wants to speak with a live agent, the user is transferred to a live agent or, if one is not yet available, continues to queue for a live agent (step 565). If the user is satisfied with the response and no longer desires to speak with a live agent, the call is terminated (step 560). If the user's query does not substantially match an entry in the database of frequently-asked query in step 550, the user is transferred to or queued for a live agent (step 565).

In one embodiment, instead of queuing the user in step 525, the IVR system could perform steps 530-550 without queuing a user for a live agent. In such embodiment, a user would only be queued for a live agent only if the system was unable to provide the user with a satisfactory assistance.

The system can learn from live agents to obtain additional automation over time. If the system is unable to recognize a user's speech input, the system can learn from a human's transcription of the speech input. If the system is unable obtain a sufficient natural language understanding of the user's query, an agent may provide a semantic tagging for the query, which can be used to train the natural language understanding interpreter. The system also can learn from agent responses to queries that are not in the database. The system may ask the user if they are satisfied with the agent's response and use the users' feedback to identify the best response to the query. In one embodiment, the system grades agent responses based on the users' feedback, and stores agent responses in association with their respective grades. If the user's query is later added to the database of frequently-asked queries, the agent response with the best grade may be used to develop a response protocol for the query.

Figure 4:
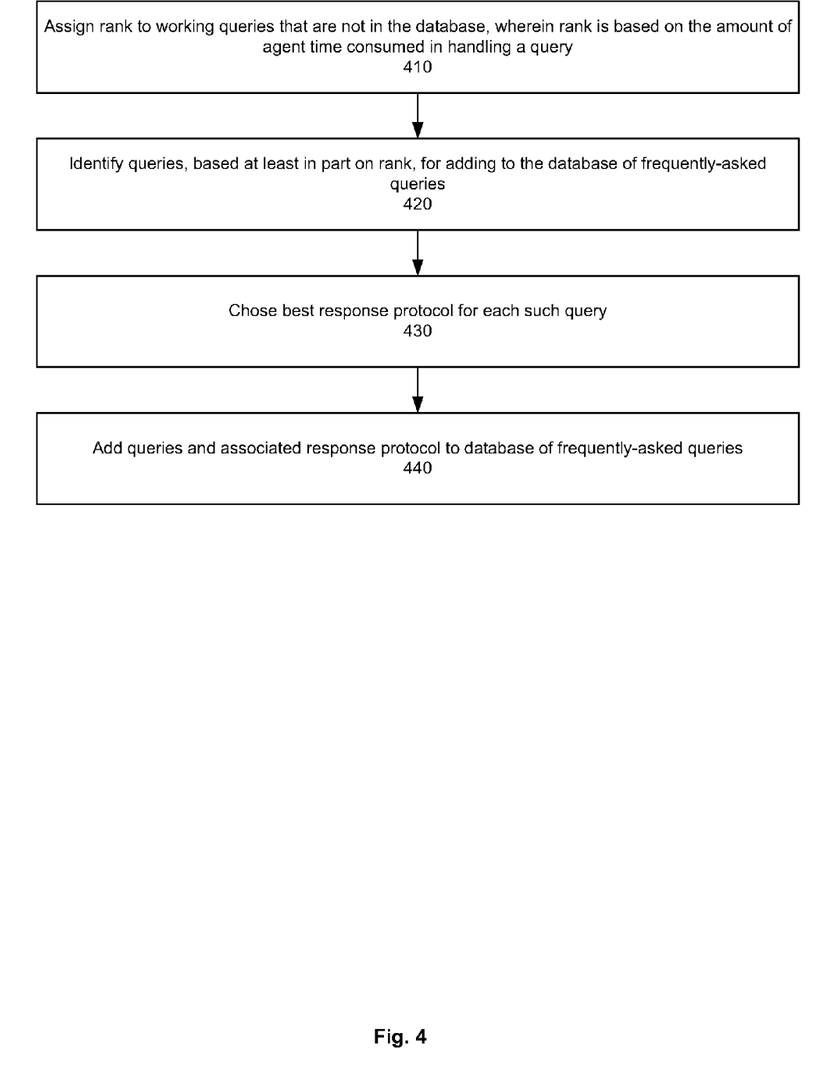
FIG. 4 is a flowchart illustrating a method for adding new queries to a database of frequently-asked queries.

FIG. 4 illustrates a method for adding new queries to the database of frequently-asked queries. The system assigns a rank to queries that are not in the database (step 410). The rankings help identify the queries that need to be added to the database. In the preferred embodiment, the system ranks queries based on the amount of agent time consumed in handling a query. The amount of agent time may be calculated as follows: agent time consumed=(number of times a query is asked)×(average agent time per query). The more agent time consumed, the higher the rank of the query. A select number of queries, based at least in part on rank, are identified for adding to the database of frequently-asked queries (step 420). The queries may be chosen automatically based solely on rank, or manually by a system administrator that may weigh several considerations. The best response protocol is then identified for each of the selected queries (step 430). In one embodiment, the grades associated with agent responses to queries are used to select the best response protocol for each added query. Other environment data, such as inventory information, also can be used to select the best response protocol. The selection can be manual or automated (e.g., based on a comparison of grades). The queries and associated response protocols are then added to the database of frequently-asked queries (step 440).

Figure 2:
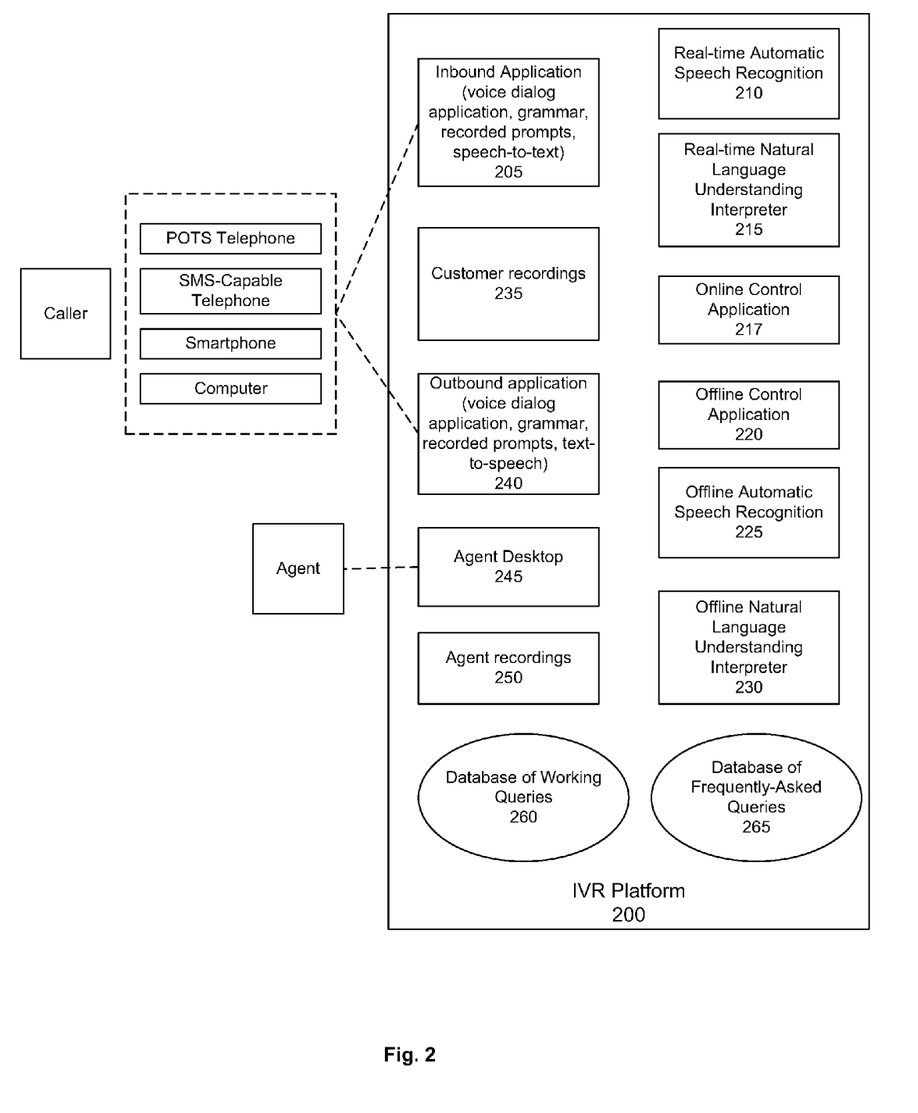
FIG. 2 is a block diagram of an example IVR platform on which the present invention can be implanted.

FIG. 2 is a block diagram of an example IVR platform on which the present invention can be implemented. FIG. 2 does not illustrate all components of an IVR system, but just those related to the present invention. Moreover, the system illustrated in FIG. 2 is merely an example, and the invention can be implanted on other types of IVR or customer service system platforms.

The platform includes an Inbound Application 205 that handles incoming user calls. The Inbound Application 205 includes a voice dialog application (e.g., a voice XML application), grammars, recorded prompts, and a speech-to-text converter. The Inbound Application 205 works in conjunction with Real-Time Speech Recognition Module 210 in order to recognize use's speech while the user is on the line in real time. The system also includes a Real-Time Natural Language Understanding Interpreter (215) that performs real-time natural language understanding if needed. For a system implementing the method of FIG. 5, an Online Control Application 217 guides the IVR system through steps 535-565.

Customer Recordings Module 235 temporarily stores queries recorded by the customer. If a user elects to record a query and then terminate the call, the Offline Control Application 220 guides the IVR system through steps 135-165 illustrated in FIG. 1.

The Offline Automatic Speech Recognition Module 225 performs offline speech recognition, and the Offline Natural Language Understanding Interpreter 230 performs offline natural language understanding. An example of a natural language understanding interpreter is disclosed in U.S. Pat. No. 6,629,066 titled "Method and System for Building and Running Natural Language Understanding Systems," the contents of which are incorporated by reference herein as if fully disclosed herein.

The IVR platform includes a Database of Working Queries 260, as well as a Database of Frequently-Asked Queries 265. The Database of Working Queries 260 stores all queries submitted by users, and the Database of Frequently-Asked Queries 265 stores frequently-asked queries for which there is a predetermined response protocol. Databases 260 and 265 can be implemented as relational database tables or structured XML documents. In one embodiment, the Database of Working Queries 260 stores the current rank of each query, wherein, as described with respect to FIG. 4, the rankings are used to identify queries that should be added to the Database of Frequently-Asked Queries 265.

Outbound Application 240 handles outbound communications to the user that are initiated by the IVR system, including calling a user back with a response to a query. Outbound Application 240 includes a voice dialog application, grammars, recorded prompts, and a text-to-speech converter. A user can communicate with the IVR system via a number of devices, such as a traditional telephone connected to the Plain Old Telephone Network (POTS), an SMS-capable Telephone, a Smartphone, or a computer.

The IVR platform 200 also includes Agent Desktops 245, as well as Agent Responses 250. Agent Responses Module 250 stores agent responses (in text or speech, but preferably in text form) to user's queries. The Agent Response Module 250 also stores the grades associated with the responses.

Figure 3A:
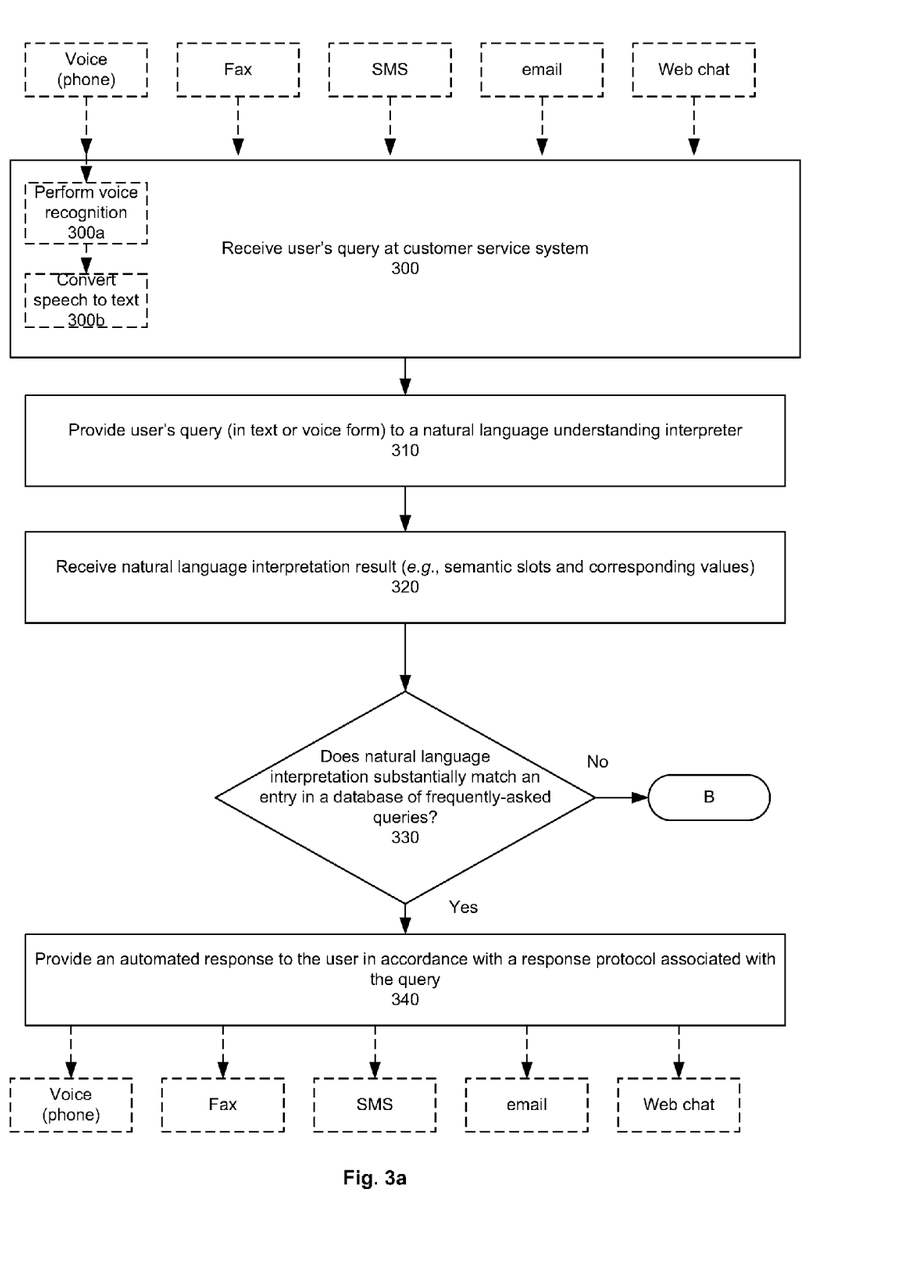
FIGS. 3a-3b are a flowchart that illustrates a method performed by a customer service system for providing an automated response to a user using natural language understanding.
Figure 3B:
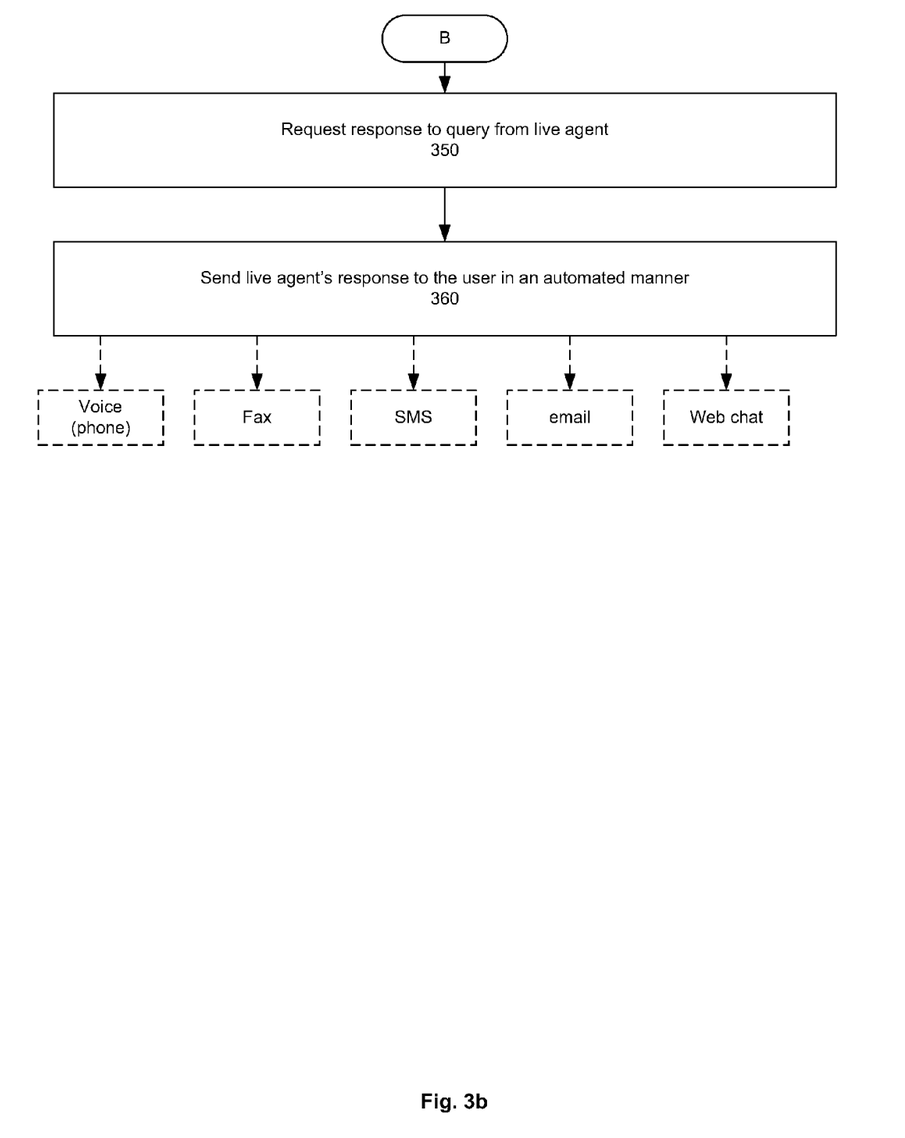

As stated above the present invention is not limited to IVR systems in which a user contacts the system via phone. The present invention can also apply to other types of customer service systems in which a user submits a query via text message, email, web chat, fax, etc. FIG. 3 illustrate another embodiment of the invention in which a customer service system can receive user queries via voice, fax, SMS, email, and/or web chat. For queries received via voice, the method is similar to FIG. 1 in that the voice input is recognized and preferably converted to text (steps 300a and 300b). For input received in text form, the user's text is provided to the natural language understanding interpreter. Steps 310-360 are essentially the same as steps 145-165 in FIG. 1.

As will be understood by those familiar with the art, the invention may be embodied in other specific forms without departing from the spirit or essential characteristics thereof. Accordingly, the above disclosure of the present invention is intended to be illustrative and not limiting of the invention.

The invention claimed is:

1. A method, performed by an IVR system, for responding to users' queries while minimizing agent cost, the method comprising:
   receiving a call from a user at an IVR system;
   receiving a request from the user to speak with a live agent;
   queuing the user for a live agent;
   prompting the user to state a query;
   recording the user's speech input for the query;
   providing the user's query to a natural language understanding interpreter;
   receiving a natural language interpretation result;
   using the natural language interpretation result, determining if the user's query matches a query in a database that includes frequently-asked queries and corresponding response protocols;
   in response to the user's query matching a query in the database, providing an automated response to the user in accordance with a predetermined response protocol for the query and asking the user if the user still desires to speak with a live agent;

in response to the user's query not matching a query in the database or in response to the user indicating that the user still desires to speak with a live agent, transferring the user to a live agent;

in response to the user being transferred to a live agent and after the live agent provides the user with a response to the user's query, prompting the user for feedback on the live agent's response, grading the live agent's response based on the user's feedback, and storing the live agent's response in association with the grade; and selecting a new response protocol for the query based at least in part on the grades associated with live agents' responses to the query.

2. The method of claim 1, wherein:

the natural language interpretation result comprises semantic slots and corresponding values;

the database of frequently-asked queries includes semantic slots and corresponding values for frequently-asked queries; and the user's query is determined to be in the database if the semantic slots and corresponding values in the interpretation result substantially match an entry in the database with a minimum confidence threshold.

3. The method of claim 1, further comprising:

for users' queries not in the database, ranking each type of user query based on the amount of live agent time consumed in handling the query; and using the rankings, prioritizing queries for adding to the database.

4. The method of claim 1, wherein if the user's query does not match a query in the database or the user indicates that the user still desires to speak with a live agent, the user is given a high priority for a live agent.

5. The method of claim 1, wherein the automated response to the user in accordance with the predetermined response protocol is provided via a voice interface.

6. The method of claim 1, wherein the automated response to the user in accordance with the predetermined response protocol is provided via SMS.

7. The method of claim 1, wherein the automated response to the user in accordance with the predetermined response protocol is provided via email.

8. The method of claim 1, wherein the automated response to the user in accordance with the predetermined response protocol is provided via web chat.

9. The method of claim 1, wherein the response protocol identifies any information needed to respond to the query and, if the IVR system does not have all such information, the IVR system's initial response to the user is to request more information from the user.

10. The method of claim 9, wherein, after receiving requested information from the user, the IVR system provides the user with a response to the user's query in accordance with the response protocol for the query.

11. A computer program embodied on a non-transitory computer-readable storage medium and comprising code, that, when executed by a computer system, enables the computer system to perform the following method:

receiving a call from a user at an IVR system;
receiving a request from the user to speak with a live agent;
queuing the user for a live agent;
prompting the user to state a query;
recording the user's speech input for the query;
providing the user's query to a natural language understanding interpreter;
receiving a natural language interpretation result;
using the natural language interpretation result, determining if the user's query matches a query in a database that includes frequently-asked queries and corresponding response protocols;

in response the user's query matching a query in the database, providing an automated response to the user in accordance with a predetermined response protocol for the query and asking the user if the user still desires to speak with a live agent;

in response to the user's query not matching a query in the database or in response to the user indicating that the user still desires to speak with a live agent, transferring the user to a live agent;

in response to the user being transferred to a live agent and after the live agent provides the user with a response to the user's query, prompting the user for feedback on the live agent's response, grading the live agent's response based on the user's feedback, and storing the live agent's response in association with the grade; and selecting a new response protocol for the query based at least in part on the grades associated with live agents' responses to the query.

12. The computer program of claim 11, wherein:

the natural language interpretation result comprises semantic slots and corresponding values;

the database of frequently-asked queries includes semantic slots and corresponding values for frequently-asked queries; and the user's query is determined to be in the database if the semantic slots and corresponding values in the interpretation result substantially match an entry in the database with a minimum confidence threshold.

13. The computer program of claim 11, further comprising:

for users' queries not in the database, ranking each type of user query based on the amount of live agent time consumed in handling the query; and using the rankings, prioritizing queries for adding to the database.

14. The computer program of claim 11, wherein if the user's query does not match a query in the database or the user indicates that the user still desires to speak with a live agent, the user is given a high priority for a live agent.

15. The computer program of claim 11, wherein the automated response to the user in accordance with the predetermined response protocol is provided via a voice interface.

16. The computer program of claim 11, wherein the automated response to the user in accordance with the predetermined response protocol is provided via SMS.

17. The computer program of claim 11, wherein the automated response to the user in accordance with the predetermined response protocol is provided via email.

18. The computer program of claim 11, wherein the automated response to the user in accordance with the predetermined response protocol is provided via web chat.

19. The computer program of claim 11, wherein the response protocol identifies any information needed to respond to the query and, if the IVR system does not have all such information, the IVR system's initial response to the user is to request more information from the user and wherein, after receiving requested information from the user, the IVR system provides the user with a response to the user's query in accordance with the response protocol for the query.

* * * * *